July 26, 1932.   F. H. PRESCOTT   1,869,115
VENTILATING FAN
Filed Feb. 4, 1929
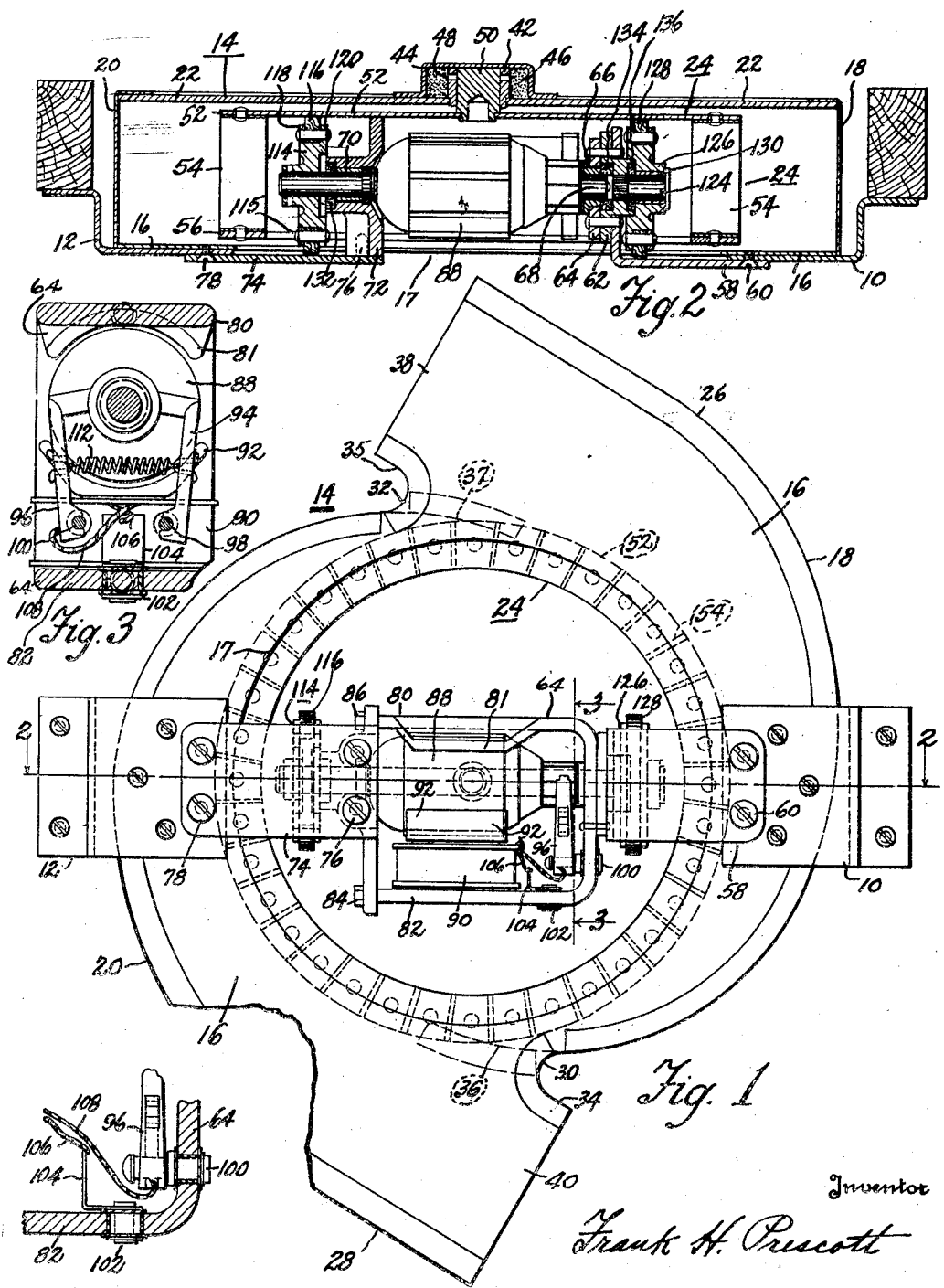

Patented July 26, 1932

1,869,115

UNITED STATES PATENT OFFICE

FRANK H. PRESCOTT, OF ANDERSON, INDIANA, ASSIGNOR TO DELCO-REMY CORPORATION, OF ANDERSON, INDIANA, A CORPORATION OF DELAWARE

VENTILATING FAN

Application filed February 4, 1929. Serial No. 337,188.

This invention relates to a ventilating fan, and in particular to a "Sirocco" type motor driven ventilating fan particularly adapted for ventilating closed passenger cars.

It is among the objects of this invention to economize in space and in the number of parts for a ventilating fan. This is accomplished by using a friction drive for transmitting motion from the motor to the fan, the driving means also supporting the weight of the fan, the motor being mounted within the cylinder generated by the blades of the fan.

Further objects and advantages of the present invention will be apparent from the following description, reference being had to the accompanying drawing, wherein a preferred embodiment of one form of the present invention is clearly shown.

In the drawing:

Fig. 1 is a bottom view.

Fig. 2 is a sectional view taken on the line 2—2 of Fig. 1.

Fig. 3 is a sectional view taken on the line 3—3 of Fig. 1.

Fig. 4 is a fragmentary detail view of the mounting of a terminal and a brush carrying rigging.

Figs. 3 and 4 are drawn to a larger scale than Figs. 1 and 2.

Referring to the drawing, the reference characters 10 and 12 indicate a pair of brackets for supporting the fan assembly. These brackets may be attached by screws or bolts to beams provided therefor in, for example, the ceiling of enclosed motor vehicles, such as passenger cars, busses, etc.

Mounted on the brackets 10 and 12 is a fan housing 14 which comprises a horizontal member 16, as viewed in Fig. 2, having an aperture 17, the diameter of this aperture being just a little smaller than the minimum width of this member. Fixedly attached to member 16 is a pair of vertical walls 18 and 20 which cooperate with a plate 22 to enclose the greater portion of the periphery and one side of the fan 24. In Fig. 1 it will be readily seen that members 18 and 20 are substantially semi-circular in shape, deviating along a tangent at 26 and 28.

In the corners 30 and 32 are mounted a pair of pieces 34 and 35 substantially J-shaped in cross-section. The sides 18 and 20 have extensions 36 and 37 extending inwardly from the corners 30 and 32 so that the housing terminates in two substantially tubular terminals 38 and 40. The walls 18 and 20 and the corner pieces 34 and 35 are each welded to each of members 16 and 22. It will be readily seen that as the fan 24 rotates in a counterclockwise direction as viewed in Fig. 1, a current of air will be ejected through the open tubular terminals 38 and 40 of the housing.

In an aperture in the center of member 22 is mounted a bearing 42 over which is mounted a cap 44 which may be welded to plate 22. Intermediate the cap and the bearing is a space 46 which may be filled with packing saturated with oil so as to supply oil through ducts 48 to a pivot or pilot 50, which is rotatably mounted in bearing 42. Pilot 50 guides the fan assembly 24 which comprises a circular driving disc and support 52 having riveted thereto the ends of a plurality of blades 54, the other end of each of the blades 54 being secured to a ring 56.

Attached to bracket 10 by screws 60 is an L-shaped bracket 58 which has riveted thereto an end supporting bracket 62 and a magnetic frame 64 of the motor. The magnetic frame 64 has a bearing 66 into which is journalled one end of an armature shaft 68. The other end of the armature shaft 68 is journalled in a bearing 70 press-fitted into a bridging bracket 72 supported on a brace 74 by screws 76. It will be clearly seen that the brace 74 is attached to bracket 12 by screws 78. The bracket 72 is also secured to each of the legs 80 and 82 of the U-shaped magnetic frame 64 by a pair of studs 84 and 86.

The leg 80 of the U-shaped member 64 has a curved portion 81 which has substantially the same curvature as the periphery of the armature core 88 as best seen in Figs. 1 and 3.

Mounted on the leg 82 of the U-shaped member 64 is a pole piece (not shown) and the field windings 90. Attached to the pole piece is a pole shoe 92. A pair of brush carrying arms 94 and 96 are mounted on the U-shaped member 64 by a pair of pins 98 and 100. The pin 100 is electrically insulated from member 64 as best seen in Fig. 4. The brushes are urged toward the commutator of the armature 88 by means of a tension spring 112 suitably attached to but insulated from each of the brush arms 94 and 96, as clearly seen in Fig. 3. Also insulated from member 64 is the terminal 102 for the motor circuit.

Tracing the motor circuit, the positive terminal of a battery or of a generator is electrically connected to terminal 102, the current flowing from 102 through member 104 through lead 106, through the field winding 90, through lead 108 which is connected to brush carrying arm 96, the current then flowing through the brush through armature 88 and through the other brush and brush arm 94 which may be grounded by a suitable lead (not shown).

On one end of the armature shaft 68 is mounted a drive wheel 114 which has a leather friction ring 116 for frictionally engaging the driving disc 52 of the fan. The leather friction ring is attached to the drive wheel 114 by means of a plurality of rivets 115 passing through a washer 118 the leather friction ring 116 and a flange 120 integral with drive wheel 114.

Adjacent the opposite end of the shaft 68 and press-fitted in the end bracket 62 is a pin 124 supporting an idler 126. The idler 126 also has a leather ring 128 secured to the idler in the same way that the leather friction ring 116 is secured to driving wheel 114. A suitable bearing 130 is press-fitted into the idler 126.

The bearings 70, 60 and 130 are oiled by felt washers 132, 134 and 136 respectively. Each of these washers have been impregnated with oil.

The weight of the fan assembly 24 is supported on the friction driving wheel 114 and the idler 126. As the pivot or pilot 50 is free to move vertically in bearing 42, it will be readily seen that the entire weight of the fan assembly 24 is carried by these members 114 and 126. As the motor rotates, drive wheel 114 which is pinned to the shaft 68 will frictionally engage driving disc 52 of the fan so that the motion of the armature is imparted to the fan assembly 24 by means of a friction drive.

There are several advantages in this type of driving mechanism for the Sirocco fan. Some of these are, a reduction of space, elimination of gears, belts, etc., and the placing of the armature in the center of the fan, thereby providing ample ventilation for the armature. The friction drive insures a quiet, smooth drive.

While the form of embodiment of the present invention as herein disclosed, constitutes a preferred form, it is to be understood that other forms might be adopted, all coming within the scope of the claims which follow.

What is claimed is as follows:

1. A device for circulating a medium, comprising in combination, a fan, an electric motor, a friction wheel attached to one end of the armature shaft of said motor, an idler rotatably mounted adjacent the other end of said armature shaft, the idler and the friction wheel cooperating to support the weight of the fan, the friction wheel imparting motion from the motor to the fan.

2. A device for circulating a medium, comprising in combination, a relatively shallow housing of cupped form having a closed head member, supporting brackets affixed at the open edge of said housing, and extending radially from a central point, aligned bearings carried at the inner ends of said brackets, an electric motor journalled in said bearings, a fan bearing carried by the head of said housing and disposed over the axis of said motor, and a fan journalled for rotation in said last mentioned bearing and having fins disposed in circular form about said motor, said motor providing a driving member and an idler that supports the fan for rotation in the housing.

3. A device for circulating a medium, comprising in combination, a fan housing of shallow cupped form, a fan bearing provided at the axis of said housing, a fan of relatively large diameter and short axial dimension having a pilot shaft journalled in said bearing, a motor situated at the axis of said bearing with its armature shaft at right angles to the axis of the pilot shaft, and means carried by the armature shaft for supporting and driving the said fan.

4. A device for circulating a medium, comprising in combination, a fan housing of shallow cupped form, a fan bearing provided at the axis of said housing, a fan of relatively large diameter and short axial dimension journalled for rotation in said bearing, an axially elongated motor supported by the housing within the contour of the fan with its armature shaft arranged substantially at right angles to the axis of said fan bearing, a driving wheel and an idler at opposite ends of said motor shaft, said fan providing a hub joining its pilot shaft and fins, the driving wheel and idler engaging the said hub whereby the fan is supported for rotation in the bearing provided by the housing.

5. A device for circulating a medium, comprising in combination, a fan housing of shallow cupped form, a fan bearing provided at the axis of said housing, a fan of shortened cylindrical form providing a disc-like hub and a single pilot shaft, means journalling the pilot shaft in said fan bearing, an electric motor supported within the fan housing having its armature shaft at right angles to the said pilot shaft, and means carried by the armature shaft for supporting and driving said fan.

6. A device for circulating a medium, comprising in combination, a fan housing of shallow cupped form, a fan bearing provided at the axis of said housing, mounting brackets secured to the housing on the opposite side of said bearing for supporting the same, diametrically aligned bearings provided by said brackets, and an electric motor having an armature shaft journalled in said bearings, a fan supported by the motor and driven thereby, said housing substantially enclosing the fan and the motor.

7. A device for circulating a medium, comprising in combination, a fan housing of shallow cupped form, a fan bearing provided at the axis of said housing, mounting brackets secured to the housing on the opposite side of said bearing for supporting the same, bearings carried by said brackets and disposed wholly within the housing, said bearings being axially aligned diametrically of the housing, an electric motor having its armature shaft journalled in said bearings, a driving wheel, an idler, means supporting the fan in the first mentioned bearing and driving the same from the motor, said means including the driving wheel and idler.

8. A device for circulating a medium, comprising in combination, a fan housing of shallow cupped form, a fan bearing provided at the axis of said housing, brackets supporting the housing and projecting inwardly toward the said bearing axis, bearings provided by each of said brackets and aligned transverse to the axis of said fan bearing, a fan journalled for rotation in the first said bearing, a motor extending within the housing and journalled in the said bracket bearings, means including said motor for supporting the fan in its bearing and driving the same.

In testimony whereof I hereto affix my signature.

FRANK H. PRESCOTT.